United States Patent
Singh et al.

(10) Patent No.: US 12,050,979 B2
(45) Date of Patent: Jul. 30, 2024

(54) BUDGETED NEURAL NETWORK ARCHITECTURE SEARCH SYSTEM AND METHOD

(71) Applicant: Cisco Technology, Inc., San Jose, CA (US)

(72) Inventors: Abhishek Singh, Pleasanton, CA (US); Debojyoti Dutta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 910 days.

(21) Appl. No.: 16/357,603

(22) Filed: Mar. 19, 2019

(65) Prior Publication Data
US 2020/0302270 A1 Sep. 24, 2020

(51) Int. Cl.
*G06N 3/044* (2023.01)
*G06N 3/08* (2023.01)

(52) U.S. Cl.
CPC .............. *G06N 3/044* (2023.01); *G06N 3/08* (2013.01)

(58) Field of Classification Search
CPC ............................... G06N 3/0445; G06N 3/08
See application file for complete search history.

(56) References Cited

U.S. PATENT DOCUMENTS 7,974,974 B2   7/2011   Tankovich et al.
2015/0248609 A1   9/2015   Julian et al.

FOREIGN PATENT DOCUMENTS

WO   2018/081563 A1   5/2018
WO   2018/184204 A1   10/2018

OTHER PUBLICATIONS

T. Veniat and L. Denoyer, "Learning Time/Memory-Efficient Deep Architectures with Budgeted Super Networks," 2018 IEEE/CVF Conference on Computer Vision and Pattern Recognition, 2018, pp. 3492-3500, doi: 10.1109/CVPR.2018.00368. (Year: 2018).*
Cai, Ermao et al. "NeuralPower: Predict and Deploy Energy-Efficient Convolutional Neural Networks" ACML 2017 [Published 2017] [Retrieved Mar. 2022] <URL:https://arxiv.org/abs/1710.05420> (Year: 2017).*
Cai, Han et al. "ProxylessNAS: Direct Neural Architecture Search on Target Task and Hardware." ICLR 2019 [V1 Published 2018] [Retrieved Mar. 2022] <URL: https://arxiv.org/abs/1812.00332> (Year: 2018).*
Jin, Haifeng "Auto-Keras . . . " [Published 2018] [Retrieved Mar. 2022] <URL: https://www.researchgate.net/profile/Haifeng-Jin-3/publication/326029461_Efficient_Neural_Architecture_Search_with_Network_Morphism/links/5c897ecc299bf14e7e7ad3a5/Efficient-Neural-Architecture-Search-with-Network-Morphism.pdf(Year: 2018).*

(Continued)

*Primary Examiner* — Ann J Lo
*Assistant Examiner* — Fen Christopher Tamulonis
(74) *Attorney, Agent, or Firm* — Polsinelli P.C.

(57) ABSTRACT

A neural network architecture search may be conducted by a controller to generate a neural network. The controller may perform the search by generating a directed acyclic graph across nodes in a search space, the nodes representing compute operations for a neural network. As the search is performed, the controller may retrieve resource availability information to modify the likelihood of a generated neural network architecture including previously unused nodes.

20 Claims, 7 Drawing Sheets

(56) References Cited

OTHER PUBLICATIONS

Zela, Arber et al. "Towards Automated Deep Learning: Efficient Joint Neural Architecture and Hyperparameter Search" ICML 2018 [Published 2018] [Retrieved Mar. 2022] <URL: https://arxiv.org/abs/1807.06906> (Year: 2018).*
Pham et al. "Efficient Neural Architecture Search via Parameter Sharing" PMLR 80 [Published 2018] [Retrieved 2022] <URL: https://arxiv.org/abs/1802.03268> (Year: 2018).*
Liu et al. "DARTS: Differentiable Architecture Search" arXiv. [Published 2018] [Retrieved 2022] <URL: https://arxiv.org/pdf/1806.09055v1.pdf> (Year: 2018).*
Asaf Valadarsky et al. "Learning to Route", HotNets-XVI https://doi.org/10.1145/3152434.3152441 (Year: 2017).*
International Search Report and Written Opinion from the International Searching Authority, mailed Jun. 18, 2020, 13 pages, for corresponding International Patent Application No. PCT/US2020/022690.
Zoph, Barret, et al., "Neutral Architecture Search With Reinforcement Learning," Feb. 15, 2017, pp. 1-16.
Schrimpf, Martin, et al., "A Flexible Approach to Automated RNN Architecture Generation," Dec. 20, 2017, pp. 1-16.
Liu, Zhengying, et al., "AutoDL Challenge Design and Beta Tests—Towards automatic deep learning," 32nd Conference on Neutral Information Processing Systems (NIPS 2018), Montreal, Canada, Oct. 26, 2018, pp. 1-6.

* cited by examiner

BUDGETED NEURAL NETWORK ARCHITECTURE SEARCH SYSTEM AND METHOD

FIELD

The present invention generally relates to machine learning model generation. In particular, the present invention relates to learned neural network architectures.

BACKGROUND

Neural network architecture search is a process of automatically generating neural network architectures from a search space. The generated neural network architectures are generally trained and compared in order to identify an optimal neural network architecture among multiple generated neural network architectures. However, generating neural network architectures can be a computationally expensive and time consuming process. Neural network architecture searches generally update the search procedure based on performance information from the generated architectures and so may be difficult or impossible to complete within a budget.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompany drawings in which.

DESCRIPTION OF EXAMPLE EMBODIMENTS

Various embodiments of the disclosure are discussed in detail below. While specific representations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain cases, well-known or conventional details are not described in order to avoid obscuring the description. References to one or more embodiments in the present disclosure can be references to the same embodiment or any embodiment; and, such references mean at least one of the embodiments.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatuses, methods, and their related results according to the embodiments of the present disclosure are given below. Note that titles or subtitles may be used in the examples for convenience of a read, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure can be realized and obtained by means of the instruments and combinations particularly pointed out in the appended claims. These and other features of the disclosure will be become fully apparent from the following description and appended claims, or can be learned by the practice of the principles set forth herein.

OVERVIEW

Tuning a neural network architecture search using resource availability can increase the efficiency of the neural network architecture search by biasing a preference for exploring an architecture space towards selecting already known and previously utilized nodes in the space. In effect, the neural network architecture search can transition to favoring known effective structures over discovering new, potentially effective structures as resource availability dwindles throughout the search.

In one embodiment hyper-parameters, including operational training parameters, are received for a search model and the search model may generate a first model based on the hyper-parameters and a first sample of an architecture space representative of a set of model components, or nodes, which can be collected together into combinations to form a trainable model. The first sample includes a first subset of the model components. The first model is trained and a performance level of the first model is determined. A first availability of one or more resources, for generating models, is determined and used to update an exploration preference variable. The search model generates a second model by exploration the architecture space based on the exploration preference variable and the performance level of the first model. The second model includes a second sample of the architecture space which includes a second subset of the model components. The second model is trained and a performance level of the second model is determined. The first trained model or the second trained model are output based on a comparison of the performance levels of the models.

EXAMPLE EMBODIMENTS

Neural networks may vary along multiple measures such as training speed, predictive accuracy, execution speed, and the like. In many cases, these varying features may be a result, in whole or in part, of the neural network architecture. For example, recurrent neural networks (RNNs) may take considerably longer to train than a feedforward neural network.

Neural networks are composed of interconnected neurons, or nodes, each of which may receive information (e.g., inputs) from one or more other nodes and provide data (e.g., output) to another one or more other nodes. As a result, any arbitrary neural network architecture can be viewed as a directional graph, such as a directional acyclic graph (DAG) in the case of a feedforward network, representing connections between nodes. Furthermore, each neural network architecture can be viewed as a subset of a collection of nodes, or of a graph. In effect, the collection of nodes from which an arbitrary neural network architecture is sampled (e.g., as a subset) can be understood as a space that can be "explored." That is to say, nodes from the larger space can be added to a neural network to generate a new architecture—likewise, nodes within a neural network (and thus the larger space) can be removed. Effectively, the larger space can be "explored" by iteratively adding and/or removing nodes within it to or from a subgraph forming a neural network architecture—sometimes referred to as an architecture search.

In some examples, an architecture search can be guided by a learning algorithm (e.g., as a component of search controller). In effect, the architecture search can be trained to preferentially explore in directions that have shown a greater degree of improvement in architecture performance (e.g., learning rate, speed of training, accuracy, etc.).

In some examples, additional parameters can constrain the architecture search learning algorithm to account for, example and without imputing limitation, for hardware limitations such as compute budget, time, and the like. For example, a reinforcement learning search architecture search algorithm can be modified by to make the randomness of the architecture search inversely proportional to, for example and without imputing limitation, time left available for the architecture search—in which case, time left available may be called a budgeting variable. While other functions may be used for the budgeting variable (e.g., compute power, fiscal cost for performing additional searches, etc.) without parting from the teachings and spirit of this disclosure, time will be used herein for explanatory purposes and the sake of clarity.

The reinforcement learning architecture search algorithm may start with a higher preference towards exploring unseen architectures and adapt to the budgeting variable (e.g., time) by performing an exponential decay of an exploration variable (e.g., the preference towards exploring unseen architectures), which may be applied to a learning gradient. Said another way, the reinforcement learning architecture search algorithm can be initialized to a high likelihood of sampling new nodes from the architecture space into newly generated architectures. As the architecture search algorithm iteratively generates new architectures, the variable responsible for sampling new nodes may be exponentially constrained based on a time value, such as remaining time for performing the architecture search.

Accordingly, as the search time progresses, previously sampled nodes (e.g., already discovered architectures) will become increasingly preferred. In effect, rather than a closed loop architecture search process, in which a controller process feeds a training process which feeds an accuracy-based reward process which in turn feeds the controller process, an open loop accounting for resource availability may increase the quality of learned architectures discovered on limited resources. The open loop may include the data path of controller process to training process to reward process; however, the controller process can take additional data from a resource availability process as well.

The resource availability process can, for example and without imputing limitation, output a "time available" value (e.g., relative to a total time based on a price of a graphical processing unit (GPU) or tensor processing unit (TPU) resource reservation) as well as a computation resource (e.g., GPU) availability. The controller process can receive the time and/or computation resource available value, or any other value, from the resource availability process and guide the architecture search based on observed rewards as well as the time/computation resource available value. In effect, the controller process may dynamically adapt to the time or resources still available for the architecture search going forward—the training may progress while the exploration variable decays (e.g., inversely to the time/computation resource available value).

Figure 1:
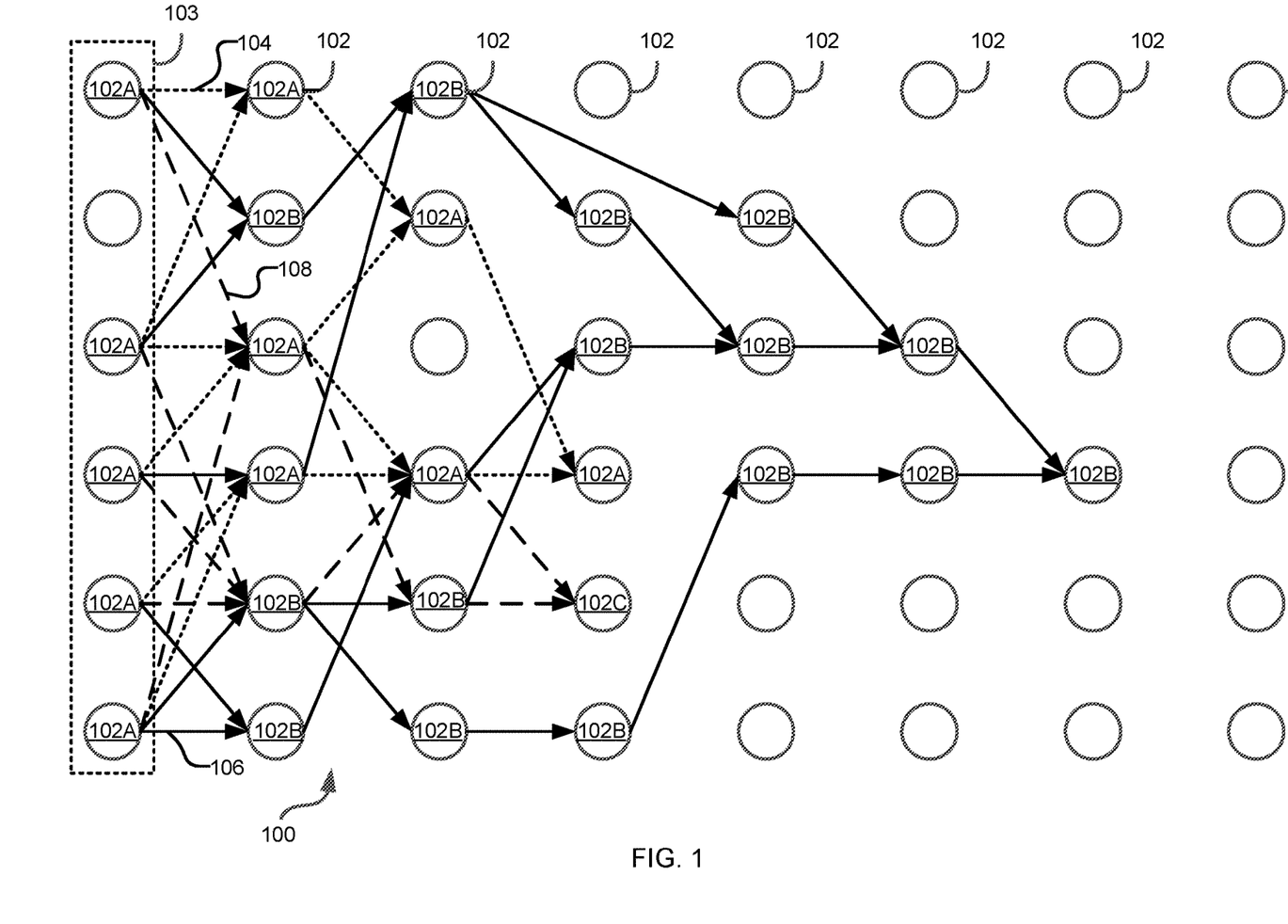
FIG. 1 illustrates an example architecture search space, according to various embodiments of the subject technology.

FIG. 1 illustrates an example architecture search space 100 which can be explored by a neural network architecture search process. Search space 100 includes a plurality of nodes 102 which each represent one or more compute operations. For example, in the case of image recognition, a single node 102 may represent a transformation such as an averaging function (e.g., over a 3×3 kernel, 5×5 kernel, etc.), identity function, and the like. While search space 100 is depicted as including 48 nodes 102, it is to be understood that this is for explanatory purposes only and a search space may include substantially more or fewer nodes 102.

Where nodes represent multiple compute operations (e.g., a 3×3 averaging transformation and a 5×5 averaging transformation), the operation outputs may be aggregated (e.g., via an add function, multiplying function, averaging function, etc.) and the aggregated outputs may be produced by the node (e.g., and provided as input to one or more upstream nodes). Nodes can be pre-constructed or, in some cases, iteratively generated as search space 100 is explored.

Additionally, certain nodes, such as nodes 103, may be input nodes which do not receive inputs from other nodes 102 within search space 100 but, instead, receive input directly. In other words, nodes 103 receive data, or features, to be processed by a respective neural network.

Within search space 100, myriad different neural network architectures composed of interconnected nodes 102 can be generated. As a result, fully exploring search space 100 may be extremely computationally expensive or require vast amounts of time. In some cases, it may not be possible to fully explore search space 100, such as where nodes 102 are iteratively constructed.

Here, generated neural network architectures 104-108 are represented by directional acyclic graphs (DAGs) which respectively include a selection of nodes 102. Consider the case where a neural network architecture search controller is initialized with a high preference towards exploration. The neural network architecture search controller may first generate neural network architecture 104, indicated by a dotted line interconnecting newly explored nodes 102A to form a DAG. Based on the initial high exploration preference, the neural network architecture search controller may generate immediately subsequent neural network architecture 106 interconnecting some earlier explored nodes 102A and also a substantial number of newly explored nodes 102B to form a new DAG. However, where the controller receives a low time availability value (e.g., time to continue to the neural network architecture search is dwindling), the preference towards exploration can be reduced in order to increase the likelihood of the controller selecting already explored nodes. As a result, the neural network architecture search controller may generate another subsequent neural network architecture 108, which interconnects a selection of previously explored nodes 102A-B and only a single newly explored node 102C (e.g., as an output node for neural network architecture 108) to form another DAG.

Figure 2:
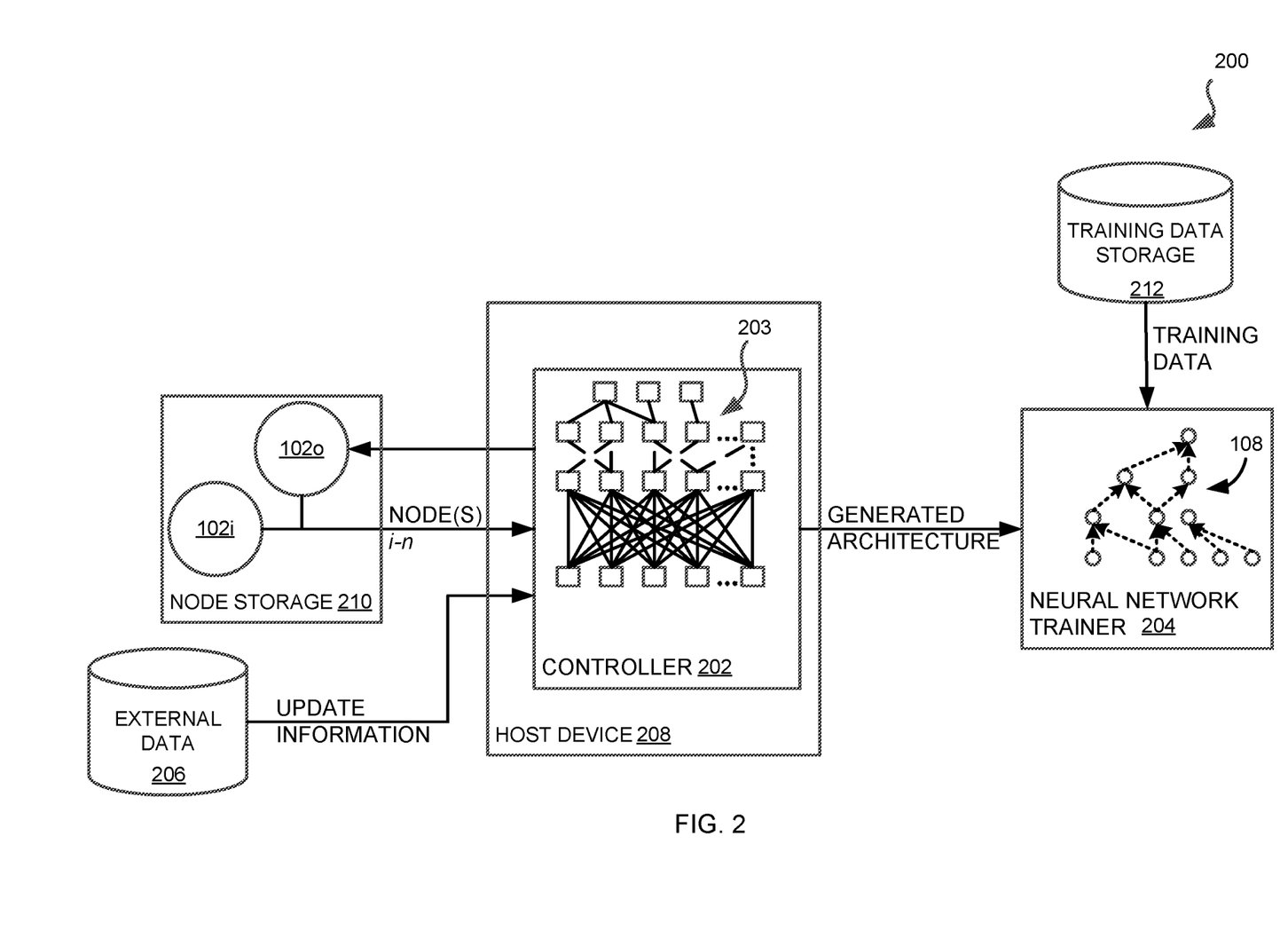
FIG. 2 illustrates an example neural network architecture search engine, according to various embodiments of the subject technology.

FIG. 2 depicts a neural network architecture search system 200 which can perform, for example, budgeted neural network architecture searches. In some examples, neural network architecture search system 200 can be included on a single device, such as a server or computer configured to generate and train neural networks. In some examples, components of neural network architecture search system 200 may be distributed between multiple devices, physical or virtual, which communicate over a network such as a local area network or virtual network, etc.

A controller 202 may be located on a host device 208, such as a server or computer. Controller 202 may include a neural network 203, or other trainable model, for exploring a search space for a neural network architecture. For example, neural network 203 may be a recurrent neural network (RNN) which receives, for at least some portion of its execution, its own output simultaneous with new inputs in order to maintain a contextual awareness. While a RNN is described for exemplary purposes in this disclosure, it is understood that variations on RNNs (e.g., long short-term memory (LSTM) networks, etc.) or other network architectures entirely may be used by controller 202 in order explore a search space.

Controller 202 may receive any number of nodes as neural network 203 explores the search space and generates a neural network architecture. In order to begin generating a neural network architecture, controller 202 can request an initial node(s) 102i, which may be an input node (e.g., node 102i receives input externally in order for data to percolate through the neural network). In response to receiving node 102i, controller 202 may request node 102o, which in turn may be again provided to controller 202 along with preceding node(s) 102i. In some examples, nodes 102i-o can be stored in a node storage 210, which may be an external database or simply local (to controller 202) memory. In some examples, requests and provision of nodes 102i-o can be accomplished via API calls and the like. In some examples, node storage 210 may include a process for generating new nodes based on information provided by controller 202 (not depicted).

Controller 202 may transmit the generated architectural to a neural network trainer 204 which can train a neural network using training data retrieved from a training data storage 212. Here, for example, neural network trainer 204 trains generated neural network architecture 108 (discussed above). Once trained, performance (e.g., accuracy, speed, etc.) of the neural network can be determined via test data and used to compare the neural network architecture against other generated neural network architectures put through a similar process.

In addition, between generating neural network architectures (e.g., iterating through or exploring the search space), controller 202 may retrieve from external data store 206 information for updating certain internal variables, such as a budgeting variable. For example, controller 202 may update a budgeting variable by retrieving a "remaining time" value (e.g., for completing the architecture search), an available compute power value, or other values as will be apparent to a person having ordinary skill in the art. In some examples, multiple values may be retrieved and processed to determine a single update value. Nevertheless, the retrieved update information can be used to modify the budgeting variable, which controller 202 may include in determining an exploration preference for neural network 203. As a result, controller 202 may explore the search space based in part on an available budget (e.g., time, compute, etc.).

Figure 3:
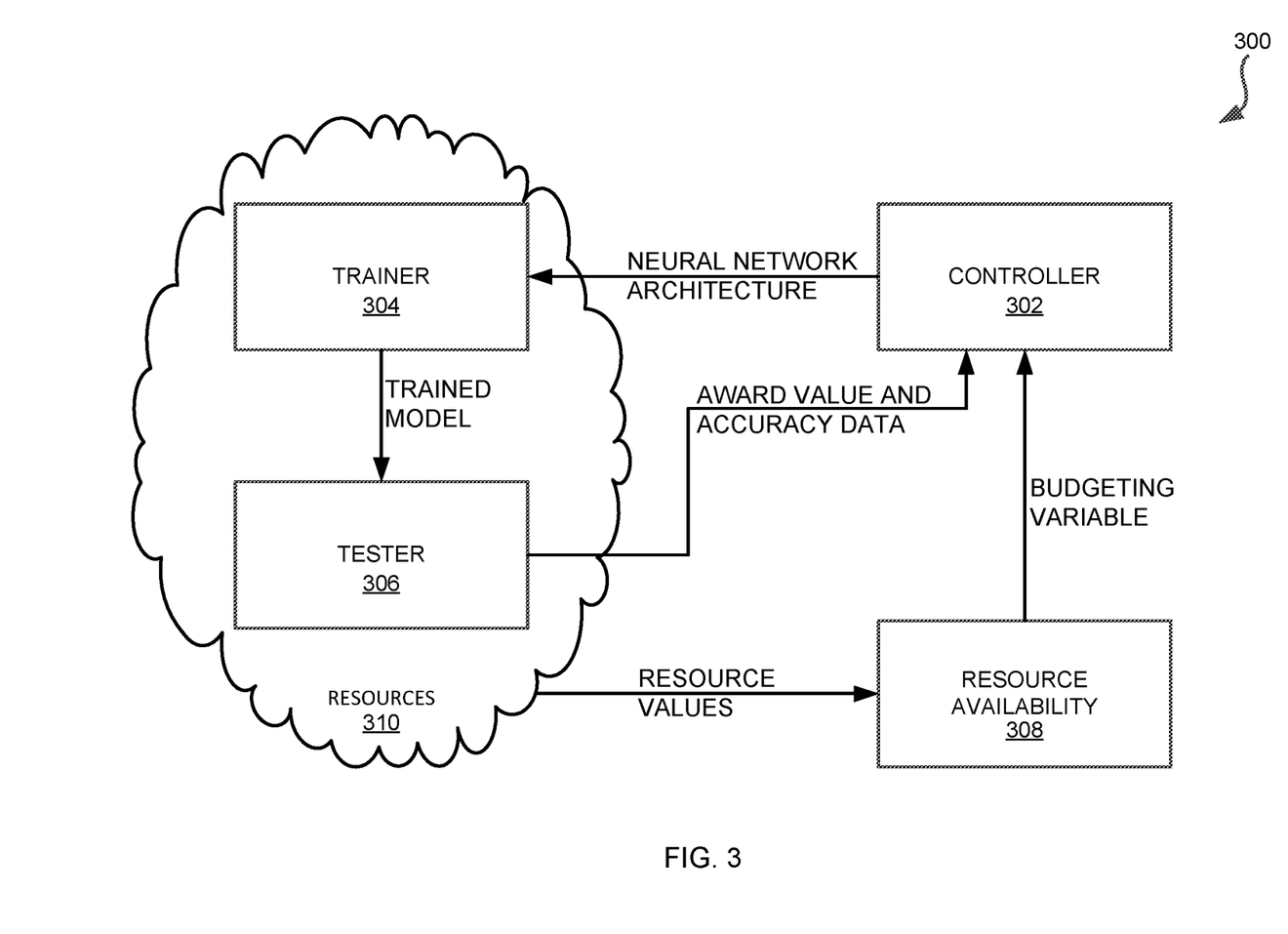
FIG. 3 illustrates an example neural network architecture search dataflow, according to various embodiments of the subject technology.

FIG. 3 depicts a neural network architecture search dataflow 300 for exploring a search space under budget constraints. In particular, dataflow 300 may iteratively generate neural network architectures based on resource availability. The generated neural network architectures may be trained, tested, and compared as a controller 302 explores the search space and generates new neural network architectures.

Controller 302 may receive budgeting variable information and award value and accuracy data in order to generate a network architecture (e.g., a DAG, as discussed above). Controller 302 can then provide a neural network architecture to a trainer 304.

Trainer 304 may train the received neural network architecture to produce a trained model (e.g., neural network) which may be provided to a tester 306. Tester 306 can execute the received neural network over testing data and determine various performance characteristics. For example, tester 306 may determine predictive accuracy of the neural network by comparing predicted results to known truths (e.g., stored in memory). Tester 306 may also determine other performance characteristics such as execution speed, model size, and the like, depending on use cases (e.g., low latency, minimal memory availability, restricted compute power, high impact predictions, etc.) for the model in deployment. Tester 306 may determine an award value for controller 302 (e.g., to update a RNN, etc.) based on the determined performance characteristics. The performance characteristics, such as accuracy, and award value may then be provided to controller 302 in order to update controller 302 and generate a new neural network architecture.

Controller 302 may also receive budgeting variable information from a resource availability process 308. In some examples, controller 302 may automatically request resource information from resource availability process 308 when award and performance data are received from tester 306. In any case, resource availability process 308 can retrieve resource values from resources 310. In some examples, resources 310 may include a resource or infrastructure manager. Resources 310 may include compute and storage resources for training and testing neural network architectures (e.g., used by trainer 304 and tester 306) and, in some examples, may include non-compute information such as fiscal budget information and the like as well (e.g., in circumstances where compute operations are tracked in fees, etc.). With budgeting variable information and award and performance information, controller 302 may adjust exploration preferences and generate a new neural network architecture based on, at least partially, resource availability.

Figure 4:
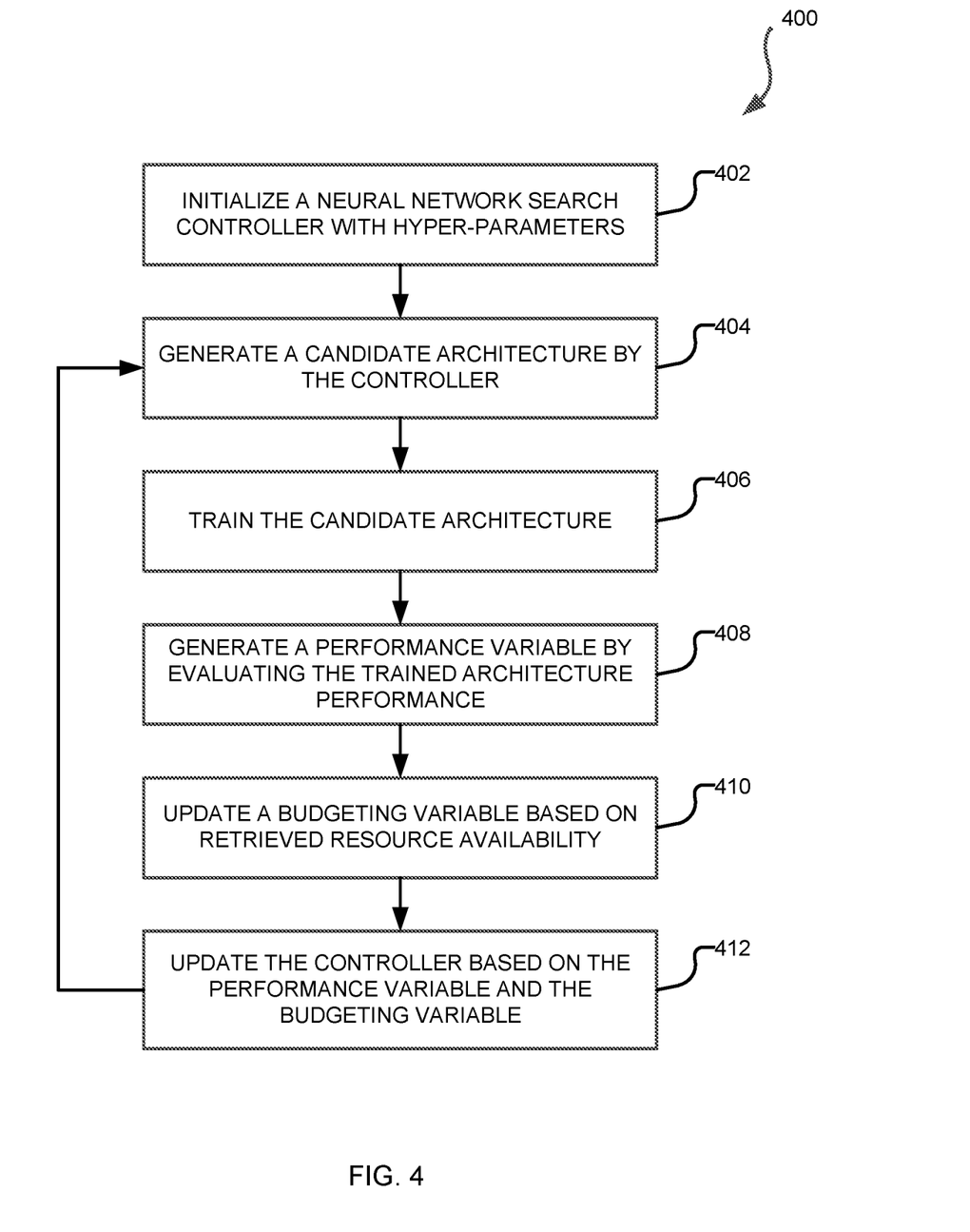
FIG. 4 illustrates an example method for performing a budgeted neural network architecture search, according to various embodiments of the subject technology.

FIG. 4 depicts a method 400 for performing a neural network architecture search. Method 400 may be performed by, for example, system 200 and according to dataflow 300 discussed above.

At step 402, a neural network search controller (e.g., controller 202, controller 302, etc.) is initialized with hyper-parameters. Hyper-parameters may include, for example and without imputing limitation, budget information (e.g., what and how resources are budgeted), training information (e.g., epoch and batch size, etc.), node information, and the like.

At step 404, the controller generates a candidate architecture. As discussed above, the candidate architecture may include a sequence, or directed acyclic graph (DAG), of nodes representing one or more compute operations. The nodes are selected from a larger search space composed of multiple nodes.

At step 406, the candidate architecture is trained. For example, trainer 304 may train the candidate architecture as discussed above. In some examples, trainer 304 may receive hyper-parameter information from the controller (e.g., controller 302), such as learning rate, epoch count, batch size, completion information for concluding training, etc.

At step 408, the trained architecture is evaluated to generate a performance variable. In some examples, multiple performance variables (e.g., along different measures such as speed, memory usage, accuracy, etc.) may be generated. In some examples, which performance variables are generated may be based on the received hyper-parameters.

At step 410, a budgeting variable is updated based on resource availability. Resource availability may be retrieved directly from relevant resources (e.g., via API call, etc.) or through a resource or infrastructure manager utility (e.g., a hypervisor, etc.).

At step 412, the controller is updated based on the performance and budgeting variables. In particular, an exploration preference may be updated as a function of the performance and budgeting variables such as in a neural network (e.g., RNN, etc.). Further, based on the budgeting variable (e.g., if there is time left or compute available, etc.), the controller may generate a new candidate architecture and repeat method 400 from step 404, creating a second, third, etc., candidate architecture which each may be trained and/or compared against each other to identify a preferred architecture (e.g., fastest learning rate, highest success rate, etc.).

Figure 5:
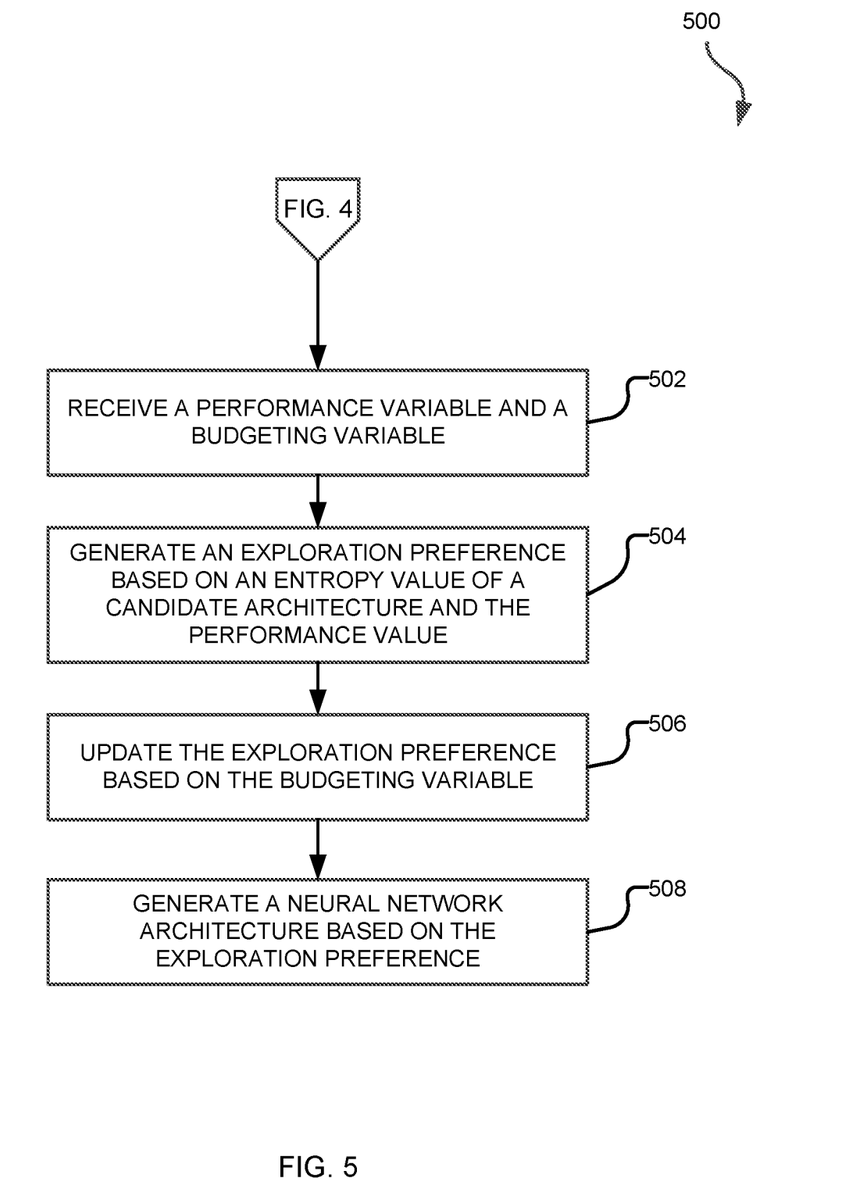
FIG. 5 illustrates an example method for updating a controller for a budgeted neural network architecture search, according to various embodiments of the subject technology.

FIG. 5 depicts a method 500 for updating a controller. In particular, method 500 may be used to update a controller as part of, or immediately following, step 412 discussed above.

At step 502, the controller receives a performance variable and a budgeting variable. At step 504, an exploration preference is generated based on an entropy value of a candidate architecture (e.g., the most recently generated candidate architecture) and the performance variable. In some examples, the entropy value may be calculated based, at least in part, on the performance variable as well as the component nodes of the candidate architecture.

At step 506, the exploration preference is further updated based on the budgeting variable. For example, the budgeting variable (e.g., where the budgeting variable is a fractional measure of time remaining of a total time allotted for performing the architecture search) may be multiplicatively applied to the exploration preference. In effect, the initial exploration preference will be updated to a factor of 1 or, said another, will not be modified at all. Subsequent updates, however, may fractionally reduce the exploration preference in relation to the fractional amount of time remaining for the search. This is but one example of updating the exploration preference based on the budgeting variable, used for explanatory purposes only and not to be taken as imputing limitation.

At step 508, a neural network architecture is generated based on the updated exploration preference. As discussed above, the exploration preference modifies the likelihood of new, or unexplored, nodes being included in a generated architecture. As a result, with a low exploration preference, a generated architecture is likely to generate a neural network architecture with few, if any, new nodes. In comparison, using a high exploration preference (e.g., as at initialization), the controller is likely to generate a neural network architecture with multiple new nodes.

Figure 6:
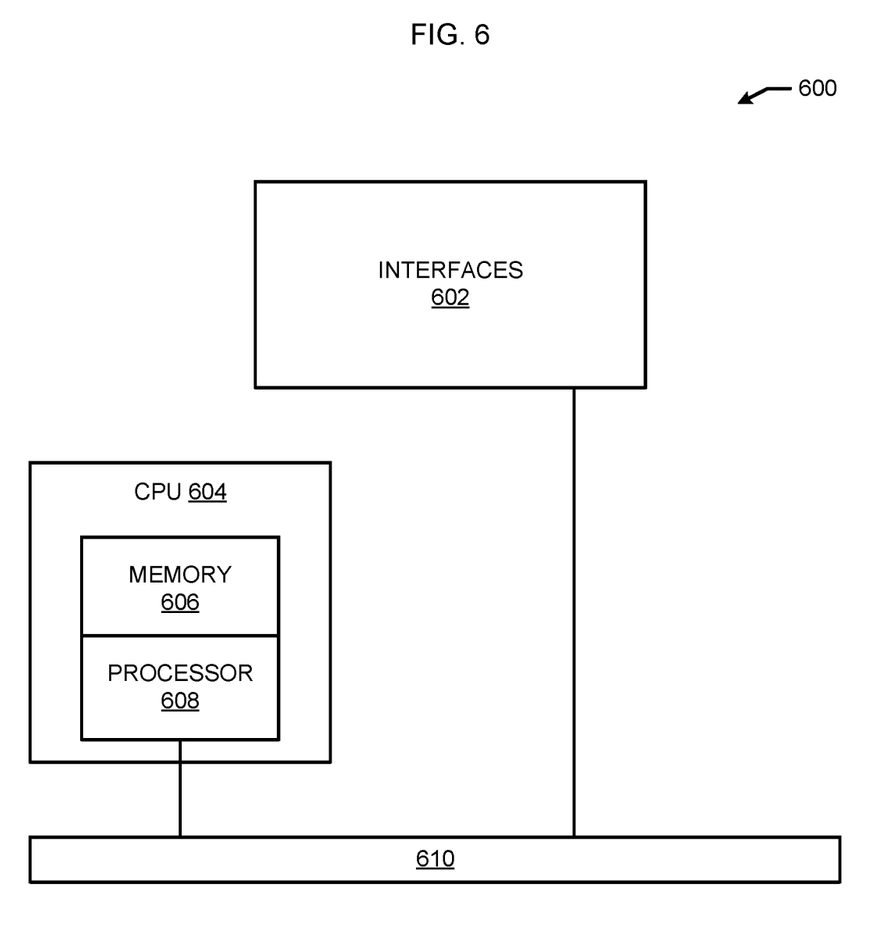
FIG. 6 illustrates an example network device, according to various embodiments of the subject technology.

Although the system shown in FIG. 6 is one specific network device of the present disclosure, it is by no means the only network device architecture on which the concepts herein can be implemented. For example, an architecture having a single processor 608 that handles communications as well as routing computations, etc., can be used. Further, other types of interfaces and media could also be used with the network device 600.

Regardless of the network device's configuration, it may employ a CPU 604 and one or more memories or memory modules (including memory 606) configured to store program instructions for the general-purpose network operations and mechanisms for functions described herein to be executed by processor 608. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing, switching, and/or other operations. The ASIC can communicate with other components in the network device 600 via the connection 610, to exchange data and signals and coordinate various types of operations by the network device 600, such as routing, switching, and/or data storage operations, for example.

Figure 7:
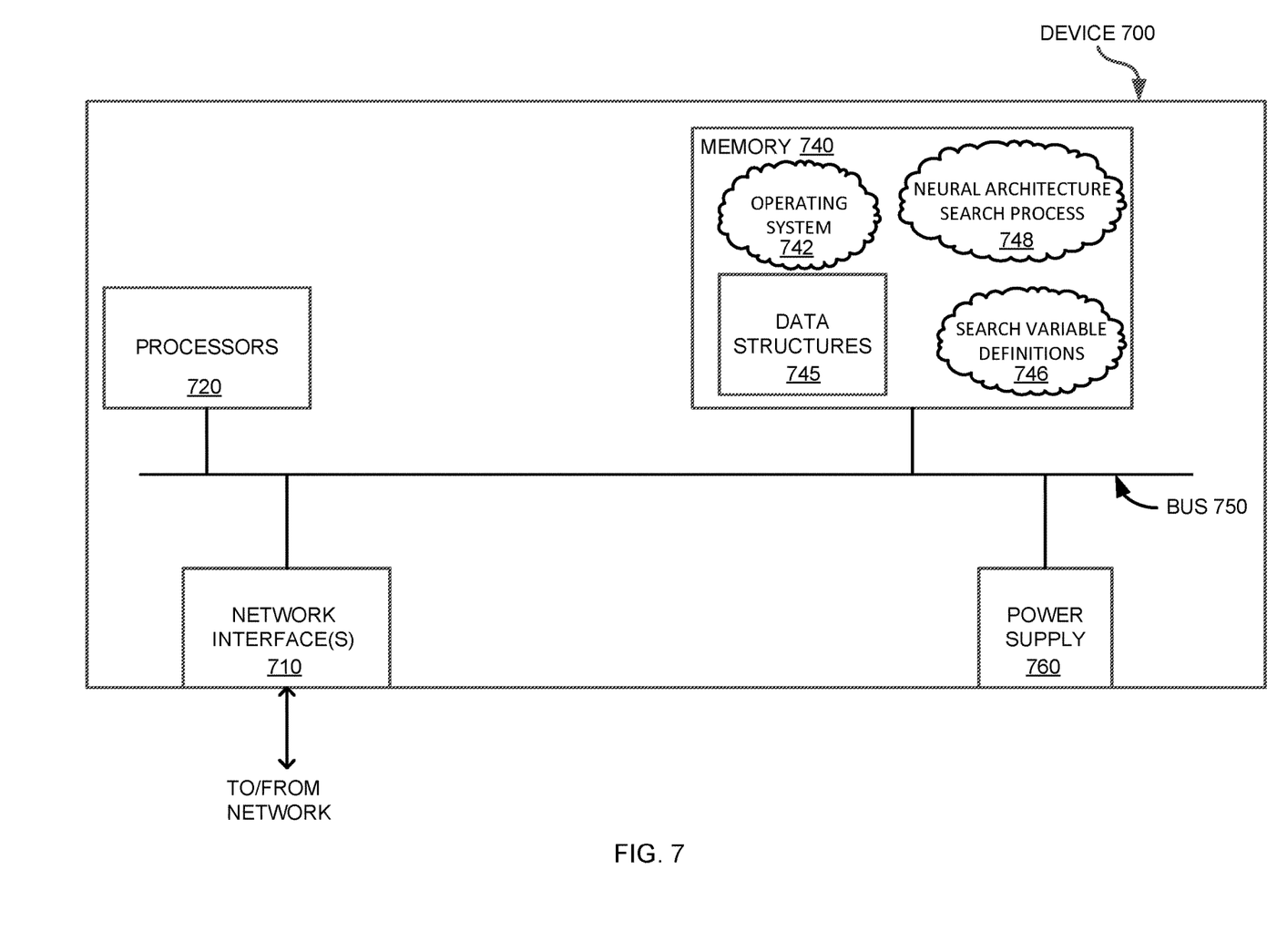
FIG. 7 illustrates an example computing device, according to various embodiments of the subject technology.

FIG. 7 is a schematic block diagram of an example computing device 700 that may be used with one or more embodiments described herein e.g., as any of the discussed above or to perform any of the methods discussed above, and particularly as specific devices as described further below. The device may comprise one or more network interfaces 710 (e.g., wired, wireless, etc.), at least one processor 720, and a memory 740 interconnected by a system bus 750, as well as a power supply 760 (e.g., battery, plug-in, etc.).

Network interface(s) 710 contain the mechanical, electrical, and signaling circuitry for communicating data over links coupled to a network, e.g., providing a data connection between device 700 and the data network, such as the Internet. The network interfaces may be configured to transmit and/or receive data using a variety of different communication protocols. For example, interfaces 710 may include wired transceivers, wireless transceivers, cellular transceivers, or the like, each to allow device 700 to communicate information to and from a remote computing device or server over an appropriate network. The same network interfaces 710 also allow communities of multiple devices 700 to interconnect among themselves, either peer-to-peer, or up and down a hierarchy. Note, further, that the nodes may have two different types of network connections 710, e.g., wireless and wired/physical connections, and that the view herein is merely for illustration. Also, while the network interface 710 is shown separately from power supply 760, for devices using powerline communication (PLC) or Power over Ethernet (PoE), the network interface 710 may communicate through the power supply 760, or may be an integral component of the power supply.

Memory 740 comprises a plurality of storage locations that are addressable by the processor 720 and the network interfaces 710 for storing software programs and data structures associated with the embodiments described herein. The processor 720 may comprise hardware elements or hardware logic adapted to execute the software programs and manipulate the data structures 745. An operating system 742, portions of which are typically resident in memory 740 and executed by the processor, functionally organizes the device by, among other things, invoking operations in support of software processes and/or services executing on the device. These software processes and/or services may comprise one or more search variable definitions 746 which, on certain devices, may be used by an illustrative neural architecture search process 748, as described herein. Notably, search variable definitions 746 may be stored and/or retrieved for storage by processor(s) 720 via, for example, network interface(s) 710 or other processes according to the configuration of device 700.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Statements follow describing various aspects of a budgeted neural network architecture search:

Statement 1: A method is disclosed for generating a trained model and includes receiving hyper-parameters for a search model, the hyper-parameters comprising operational training parameters for the search model, generating, by the search model, a first model based on the hyper-parameters and a first sample of an architecture space, the architecture space representative of a set of model components which may be collected together into combinations to form a trainable model, and the first sample a first subset of the model components, training the first model, determining a performance level of the trained first model, determining a first availability of one or more resources for generating models, updating an exploration preference variable based on the first availability of the one or more resources, generating a second model, by the search model, by exploring the architecture space based on the exploration preference variable and the performance level of the trained first model, exploration of the architecture space comprising generating a second sample of the architecture space, the second sample comprising a second subset of the model components, training the second model, determining a performance level of the trained second model, and outputting one of the first trained model or the second trained model based on a comparison the performance levels.

Statement 2: The method of Statement 1, may further include generating a third or more models based on a second or more availabilities of the one or more resources for generating models, training the third or more models, and determining a respective performance level of each trained model of the trained third or more models, wherein the output model is based on a comparison of the performance levels of each of the trained models.

Statement 3: The method of any of the preceding Statements, wherein the hyper-parameters are received by a controller comprising a recurrent neural network (RNN) and the method further comprising updating the RNN with the exploration preference variable.

Statement 4: The method of Statement 3, wherein the controller updates the RNN using reinforcement learning, may further include determining an exploitation reward based on the generated second model, the exploitation reward corresponding to a preference for including known model components in a generated model, and updating the RNN based on a combination of the exploitation reward and the exploration preference variable, wherein the controller uses the updated RNN to explore the architecture space.

Statement 5: The method of any of the preceding Statements, wherein the one or more resources for generating models includes at least one of remaining compute time or compute power.

Statement 6: The method of any of the preceding Statements, wherein determining the first availability of the one or more resources comprises making an application programming interface (API) call to one or more external resources.

Statement 7: The method of any of the preceding Statements, wherein the exploration preference variable is proportional to the availability of the one or more resources for generating models.

Statement 8: A system is disclosed for generating a trained model and the system includes one or more processors, and a memory comprising instructions which cause the one or more processors to receive hyper-parameters for a search model, the hyper-parameters comprising operational training parameters for the search model, generate, by the search model, a first model based on the hyper-parameters and a first sample of an architecture space, the architecture space representative of a set of model components which may be collected together into combinations to form a trainable model, and the first sample a first subset of the model components, train the first model, determine a performance level of the trained first model, determine a first availability of one or more resources for generating models, update an exploration preference variable based on the first availability of the one or more resources, generate a second model, by the search model, by exploring the architecture space based on the exploration preference variable and the performance level of the trained first model, exploration of the architecture space comprising generating a second sample of the architecture space, the second sample comprising a second subset of the model components, train the second model, determine a performance level of the trained second model, and output one of the first trained model or the second trained model based on a comparison the performance levels.

Statement 9: A non-transitory computer readable medium is disclosed and includes instructions that, when executed by one or more processors, cause the one or more processors to, receive hyper-parameters for a search model, the hyper-parameters comprising operational training parameters for the search model, generate, by the search model, a first model based on the hyper-parameters and a first sample of an architecture space, the architecture space representative of a set of model components which may be collected together into combinations to form a trainable model, and the first sample a first subset of the model components, train the first model, determine a performance level of the trained first model, determine a first availability of one or more resources for generating models, update an exploration preference variable based on the first availability of the one or more resources, generate a second model, by the search model, by exploring the architecture space based on the exploration preference variable and the performance level of the trained first model, exploration of the architecture space comprising generating a second sample of the architecture space, the second sample comprising a second subset of the model components, train the second model, determine a performance level of the trained second model, and output one of the first trained model or the second trained model based on a comparison the performance levels.

What is claimed is:

1. A method comprising:
    training, by a controller, a first candidate model based on a first set of components of a first neural network architecture applied to training data;
    determining a first availability of one or more resources for generating models;
    updating the controller based on a first exploration preference and the first availability of the one or more resources, wherein the first exploration preference is based on an entropy value that corresponds with a learning gradient based on exploring unseen neural network architectures in previous trainings of different neural network architectures, the entropy value being further based on (i) the first set of components of the first neural network architecture and (ii) a performance level of the first candidate model;
    iteratively generating a second neural network architecture based on a second availability of the one or more resources by modifying the first neural network architecture based on the first exploration preference, wherein a number of new components are interconnected with the first set of components to train a second candidate model;
    adapting the first exploration preference to a decrease of the second availability of the one or more resources for generating models by performing an exponential decay of the first exploration preference based on the learning gradient to generate a second exploration preference, the exponential decay causing the second exploration preference to correspond to an exponentially constrained preference for sampling new components based on a remaining time for performing an architecture search;
    iteratively generating a third neural network architecture based on a third availability of the one or more resources by modifying the second neural network architecture based on the second exploration preference, wherein the number of new components interconnected with the first set of components is reduced and a number of previously sampled components is increased based on the exponential decay of the first exploration preference to train a third candidate model; and
    comparing a performance level of the first candidate model applied to the training data, a performance level of the second candidate model, and a performance level of the third candidate model to identify whether the first exploration preference or the second exploration preference produces a preferred neural network architecture.

2. The method of claim 1, further comprising:
    generating the second or more candidate models by exploring an architecture space based on the first exploration preference and the performance level of the trained first candidate model, exploration of the architecture space comprising generating a second sample of the architecture space, the second sample comprising the new components;
    training the second or more candidate models; and
    determining a respective performance level of each trained candidate model of the trained second or more candidate models;
    wherein an output of the one of the first trained candidate model or the second trained candidate model is based on a comparison of the performance levels of each of the trained first, second and more candidate models.

3. The method of claim 1, wherein the controller initializes a search model with hyper-parameters comprising operational training parameters for the search model, and wherein the hyper-parameters are received by the initialized controller comprising a recurrent neural network (RNN) and the method further comprising updating the RNN with the exploration preference.

4. The method of claim 3, wherein the initialized controller updates the RNN using reinforcement learning, the method further comprising:
 determining an exploitation reward based on the generated first candidate model, the exploitation reward corresponding to a preference for including known model components in a generated model; and
 updating the RNN based on either or both of the exploitation reward and the exploration preference, wherein the initialized controller uses the updated RNN to explore an architecture space of the second neural network architecture.

5. The method of claim 1, wherein the one or more resources for generating models includes a remaining compute power.

6. The method of claim 1, wherein determining the first availability of the one or more resources comprises making an application programming interface (API) call to one or more external resources.

7. The method of claim 1, wherein the first exploration preference is proportional to the availability of the one or more resources for generating models.

8. A system comprising:
 one or more processors; and
 a memory comprising instructions which cause the one or processors to:
  train, by a controller, a first candidate model based on a first set of components of a first neural network architecture applied to training data;
  determine a first availability of one or more resources for generating models;
  update the controller based on a first exploration preference and the first availability of the one or more resources, wherein the first exploration preference is based on an entropy value that corresponds with a learning gradient based on exploring unseen neural network architectures in previous trainings of different neural network architectures, the entropy value being further based on (i) the first set of components of the first neural network architecture and (ii) a performance level of the first candidate model; and
  iteratively generate a second neural network architecture based on a second availability of the one or more resources by modifying the first neural network architecture based on the first exploration preference, wherein a number of new components are interconnected with the first set of components to train a second candidate model;
  adapt the first exploration preference to a decrease of the second availability of the one or more resources for generating models by performing an exponential decay of the first exploration preference based on the learning gradient to generate a second exploration preference, the exponential decay causing the second exploration preference to correspond to an exponentially constrained preference for sampling new components based on a remaining time for performing an architecture search;
  iteratively generate a third neural network architecture based on a third availability of the one or more resources by modifying the second neural network architecture based on the second exploration preference, wherein the number of new components interconnected with the first set of components is reduced and a number of previously sampled components is increased based on the exponential decay of the first exploration preference to train a third candidate model; and
  compare a performance level of the first candidate model applied to the training data, a performance level of the second candidate model, and a performance level of the third candidate model to identify whether the first exploration preference or the second exploration preference produces a preferred neural network architecture.

9. The system of claim 8, wherein the memory further comprises instructions to:
 generate the second or more candidate models by exploring an architecture space based on the first exploration preference and the performance level of the trained first candidate model, exploration of the architecture space comprising generating a second sample of the architecture space, the second sample comprising the new components;
 train the second or more candidate models; and
 determine a respective performance level of each trained candidate model of the trained second or more candidate models;
 wherein an output of the one of the first trained candidate model or the second trained candidate model is based on a comparison of the performance levels of each of the first, second and more trained candidate models.

10. The system of claim 8, wherein the controller initializes a search model with hyper-parameters comprising operational training parameters for the search model, and wherein the hyper-parameters are received by the initialized controller comprising a recurrent neural network (RNN) and the memory further comprises instructions to update the RNN with the exploration preference.

11. The system of claim 10, wherein the initialized controller updates the RNN using reinforcement learning, the memory further comprising instructions to:
 determine an exploitation reward based on the generated first candidate model, the exploitation reward corresponding to a preference for including known model components in a generated model; and
 update the RNN based on either one or both of the exploitation reward and the exploration preference, wherein the initialized controller uses the updated RNN to explore an architecture space of the second neural network architecture.

12. The system of claim 8, wherein the one or more resources for generating models includes a remaining compute power.

13. The system of claim 8, wherein determining the first availability of the one or more resources comprises making an application programming interface (API) call to one or more external resources.

14. The system of claim 8, wherein the first exploration preference is proportional to the availability of the one or more resources for generating models.

15. A non-transitory computer readable medium comprising instructions that, when executed by one or more processors, cause the one or more processors to:
 train, by a controller, a first candidate model based on a first set of components of a first neural network architecture applied to training data;
 determine a first availability of one or more resources for generating models;
 update the controller based on a first exploration preference and the first availability of the one or more resources, wherein the first exploration preference is based on an entropy value that corresponds with a learning gradient based on exploring unseen neural network architectures in previous trainings of different neural network architectures, the entropy value being further based on (i) the first set of components of the first neural network architecture and (ii) a performance level of the first candidate model; and iteratively generate a second neural network architecture based on a second availability of the one or more resources by modifying the first neural network architecture based on the first exploration preference, wherein a number of new components are interconnected with the first set of components to train a second candidate model;

adapt the first exploration preference to a decrease of the second availability of the one or more resources for generating models by performing an exponential decay of the first exploration preference based on the learning gradient to generate a second exploration preference, the exponential decay causing the second exploration preference to correspond to an exponentially constrained preference for sampling new components based on a remaining time for performing an architecture search;

iteratively generate a third neural network architecture based on a third availability of the one or more resources by modifying the second neural network architecture based on the second exploration preference, wherein the number of new components interconnected with the first set of components is reduced and a number of previously sampled components is increased—based on the exponential decay of the first exploration preference to train a third candidate model; and compare a performance level of the first candidate model applied to the training data, a performance level of the second candidate model, and a performance level of the third candidate model to identify whether the first exploration preference or the second exploration preference produces a preferred neural network architecture.

16. The non-transitory computer readable medium of claim 15, further comprising instructions to:

generate the second or more candidate models by exploring an architecture space based on the first exploration preference and the performance level of the trained first candidate model, exploration of the architecture space comprising generating a second sample of the architecture space, the second sample comprising the new components;

train the second or more candidate models; and determine a respective performance level of each trained candidate model of the trained second or more candidate models;

wherein an output of the one of the first trained candidate model or the second trained candidate model is based on a comparison of the performance levels of each of the first, second and more trained candidate models.

17. The non-transitory computer readable medium of claim 15, wherein the controller initializes a search model with hyper-parameters comprising operational training parameters for the search model, and wherein the hyper-parameters are received by the initialized controller comprising a recurrent neural network (RNN), and further comprising instructions to:

determine an exploitation reward based on the generated first candidate model, the exploitation reward corresponding to a preference for including known model components in a generated model; and update the RNN based on either one or both of the exploitation reward and the exploration preference, wherein the initialized controller uses the updated RNN to explore an architecture space of the second neural network architecture.

18. The non-transitory computer readable medium of claim 15, wherein the one or more resources for generating models includes a remaining compute power.

19. The non-transitory computer readable medium of claim 15, wherein determining the first availability of the one or more resources comprises making an application programming interface (API) call to one or more external resources.

20. The non-transitory computer readable medium of claim 15, wherein the first exploration preference is proportional to the availability of the one or more resources for generating models.

* * * * *